US007567654B2

(12) United States Patent
Luft et al.

(10) Patent No.: US 7,567,654 B2
(45) Date of Patent: *Jul. 28, 2009

(54) METHOD FOR SETTING UP A COMMUNICATION LINK

(75) Inventors: Achim Luft, Braunschweig (DE); Norbert Schwagmann, Braunschweig (DE); Markus Trauberg, Velchede (DE); Martin Wulsten, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 255 days.

This patent is subject to a terminal disclaimer.

(21) Appl. No.: 10/573,974

(22) PCT Filed: Aug. 23, 2004

(86) PCT No.: PCT/EP2004/051879

§ 371 (c)(1),
(2), (4) Date: Mar. 30, 2006

(87) PCT Pub. No.: WO2005/034538

PCT Pub. Date: Apr. 14, 2005

(65) Prior Publication Data
US 2007/0127651 A1    Jun. 7, 2007

(30) Foreign Application Priority Data
Sep. 30, 2003    (DE)    ................. 103 45 443

(51) Int. Cl.
*H04M 11/00*    (2006.01)
(52) U.S. Cl. ................. 379/88.13; 379/218.01; 379/355.01; 455/415; 455/435; 455/566
(58) Field of Classification Search ............ 379/142.01, 379/142.15
See application file for complete search history.

(56) References Cited

U.S. PATENT DOCUMENTS 6,640,278 B1 *   10/2003   Nolan et al. ................. 709/203

(Continued)

FOREIGN PATENT DOCUMENTS

EP    1 289 241 A1    3/2003

(Continued)

OTHER PUBLICATIONS

International Search Report for Application No. PCT/EP2004/051879 mailed Mar. 15, 2005.

*Primary Examiner*—Curtis Kuntz
*Assistant Examiner*—Phung-Hoang J Nguyen
(74) *Attorney, Agent, or Firm*—Staas & Halsey LLP

(57) ABSTRACT

A communication link from a first telecommunication device to a second telecommunication device is established via a telecommunication network. Initially, a plurality of multimedia objects, which are associated with a first telecommunication subscriber, are stored together with a respective reference number in the telecommunication network. An allocation representation of at least one data set is also determined, the representation indicating a specific call receiver with reference to a specific reference number of a multimedia object. Subsequently, a link set up request is sent from the first telecommunication device associated with the first telecommunication subscriber to the telecommunication network, the link set up request indicating that a communication link should be set up between the first telecommunication device and the second telecommunication device associated with a selected call receiver. The specific reference number for the selected call receiver is determined by representation of the allocation and the multi-media object associated with the determined reference number is transmitted by the telecommunication network to the second telecommunication device. Finally, the multimedia-object is reproduced on the second telecommunication device.

8 Claims, 2 Drawing Sheets

U.S. PATENT DOCUMENTS 6,937,612 B1 * 8/2005 Mauger et al. ............... 370/465

FOREIGN PATENT DOCUMENTS

| JP | 7-245656 | | 9/1995 |
|---|---|---|---|
| JP | EP1289241 | * | 3/2001 |
| JP | 2002-64658 | | 2/2002 |
| JP | 2002-112061 | | 4/2002 |
| JP | 2003-46664 | | 2/2003 |
| JP | 2003-101615 | | 4/2003 |

* cited by examiner

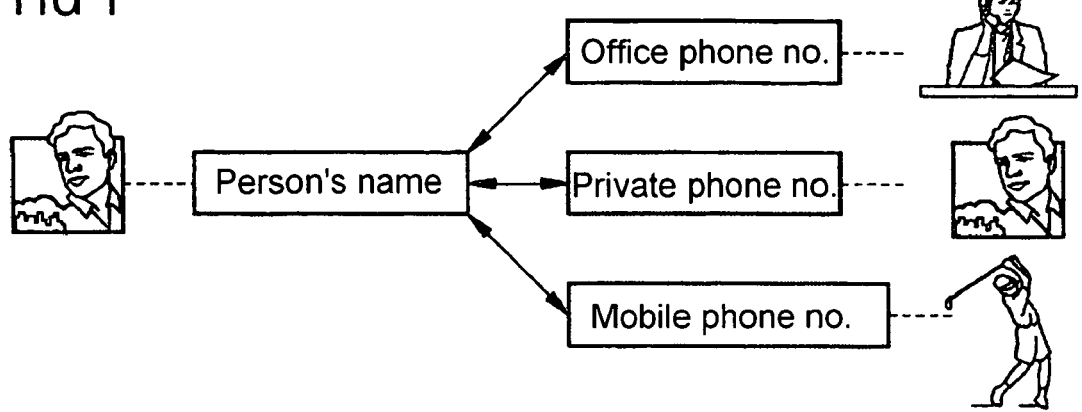
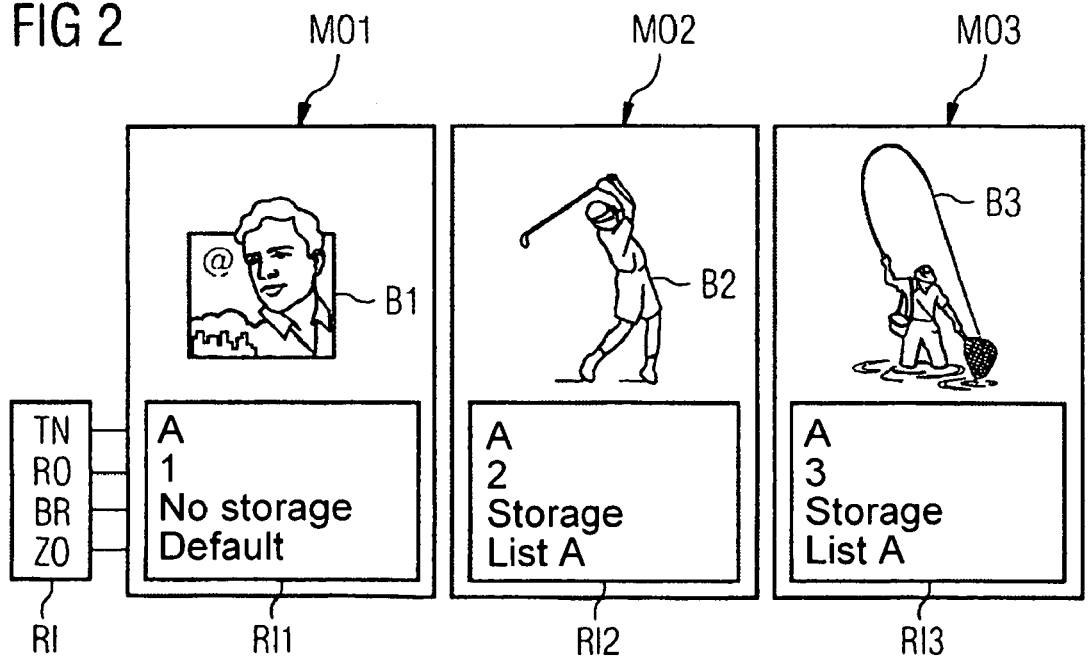

FIG 3
| A | |—LA
|---|---|
| RE | RO |
| C | 2 |
| D | 3 |
| F | 2 |
FIG 4
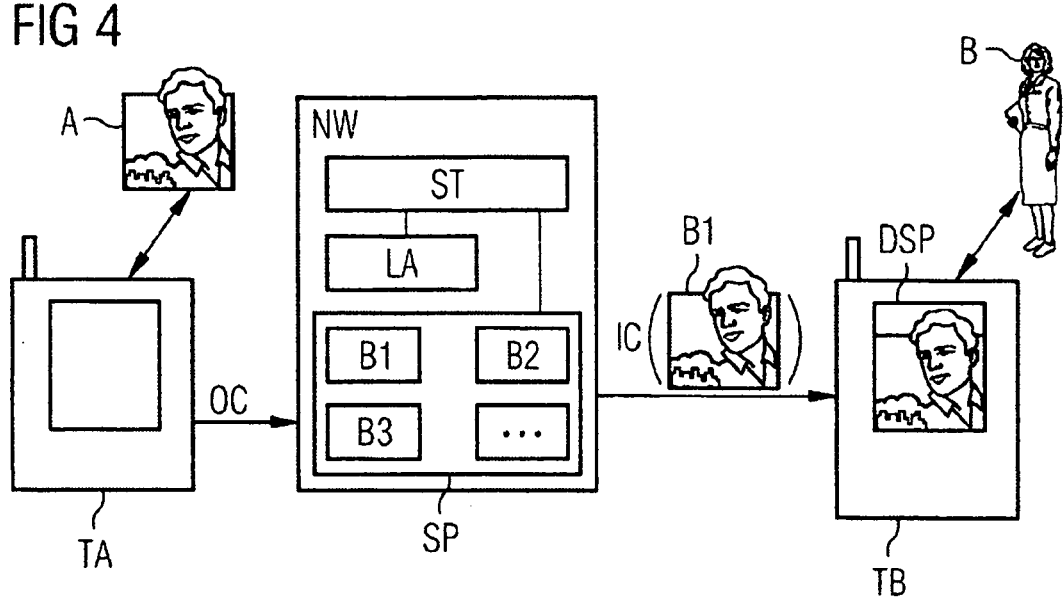
FIG 5
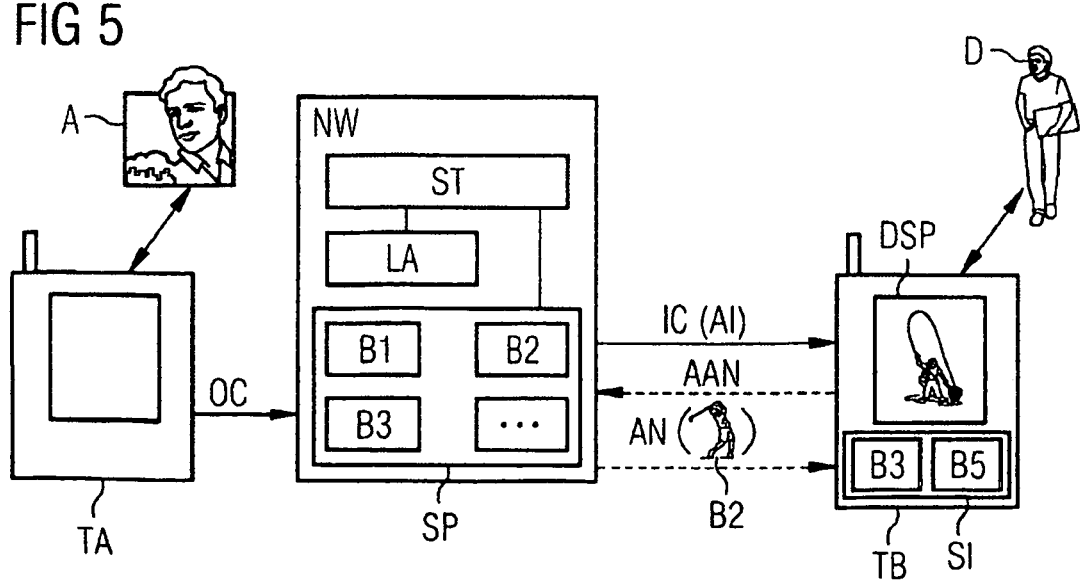

METHOD FOR SETTING UP A COMMUNICATION LINK

CROSS REFERENCE TO RELATED APPLICATIONS

This application is based on and hereby claims priority to German Application No. 103 45 443.8 filed on Sep. 30, 2003, the contents of which are hereby incorporated by reference.

BACKGROUND OF THE INVENTION

1. Field of the Invention

The present invention relates to a method for setting up a communication link from a first telecommunication device via a telecommunication network to a second telecommunication device and relates especially to a method in which in the ringing signaling at the second telecommunication device, data, such as pictures or sounds of the user of the first telecommunication device are displayed or played back.

2. Description of the Related Art

Communication between people by telephony, especially mobile telephony is becoming increasingly significant. In such cases it is important for a telecommunication subscriber, especially when setting up a telephone connection, to know the identity of the caller before answering or accepting the call. The called telecommunication subscriber can use different devices to display the caller identification, for example in the form of the name and the telephone number of the caller. In a first method a database is provided in such cases in the telecommunication device of the telephone subscriber, in which telephone numbers and associated names, as well as picture relating to the name are stored. Thus for a call, in which the telephone number of the caller is transmitted in the conventional way, the telecommunication device of the called party determines the associated name as well as the picture of the caller in the database and, in addition to the caller's telephone number and their name, also displays a picture of them.

The disadvantage of a procedure in accordance with this first method is that the caller himself has no influence on the picture stored in and displayed on the call recipient's telecommunication device. The settings for displaying and selecting the picture lie with the call recipient in this case, with caller neither being able to force the display of a specific picture, nor update the displayed picture, but can however have an updated picture submitted to the call recipient.

To solve this problem of giving a caller control of the picture displayed or to be displayed at a call recipient in call signaling, in accordance with a second method there is also the option for the caller to send the picture which is to be displayed to the recipient of the call from his telecommunication device to a telecommunication network switching the communication link (telephone connection), with the telecommunication network letting the picture be submitted with the call signalling to the telecommunication device of the call recipient. In this way the caller himself can select the picture to be displayed to the call recipient. This option is especially also of interest for companies which can use this method to enable their logo to be displayed to the called subscriber or the call recipient when setting up a connection. This disadvantage of this procedure in accordance with the second method however is that the user must now first send a picture at each connection setup to a telecommunication network for forwarding to the telecommunication device of the call recipient. This means that a very high load is imposed on the air interface especially with a telecommunication device embodied as a mobile telephone and a telecommunication network embodied as a mobile radio network.

SUMMARY OF THE INVENTION

It is thus an object of the present invention to create an opportunity for resource-saving setup of a communication link in which the caller is guaranteed control over the ringing signalling.

The hallmark of a method for setting up a communication link from a first telecommunication device over a telecommunication network to a second telecommunication device in accordance with a first aspect of the invention is that a plurality of multimedia objects, which can feature pictures or also tones or tone information, are stored in the telecommunication network. Thus it is possible that a telecommunication subscriber, such as a telecommunication subscriber assigned to the first telecommunication device, stores a plurality of different multimedia objects, especially pictures, together with a relevant reference number in the telecommunication network. This type of storage or this type of uploading can be undertaken for example by the first telecommunication subscriber arranging the pictures using his first telecommunication device or using another device, such as a computer connected to the Internet via the Internet in a telecommunication network. Furthermore it is possible for the telecommunication subscriber to send his multimedia objects via e-mail to the operator of the telecommunication network so that the latter stores the multimedia objects in the telecommunication network. The objects can be uploaded at any time.

In order to now create an opportunity in which a specific multimedia object in each case especially a picture of a caller to identify the caller is transferred to the various call recipients, an assignment mapping or assignment table with a least one data record is defined, with the assignment between a specific call recipient to a specific reference number of a multimedia object being specified in an appropriate data record. This means that if a caller—in the example the first communication subscriber—selects a specific call recipient in order to ring or call the latter, this assignment mapping can be helpful in determining the multimedia object to be displayed at the call recipient. If the caller or the first communication subscriber has now selected a specific call recipient, the following operations are executed. A connection setup request from the first telecommunication device assigned to the first telecommunication subscriber is sent to the telecommunication network, with this connection setup request specifying that a communication link, especially a telephone connection is to be set up from the first telecommunication device to a second telecommunication device assigned to a selected call recipient. Furthermore—as already mentioned—the assignment mapping is used to determine which multimedia object or which reference number assigned to this object is to be allocated to the selected call recipient. As will be further explained below, the last two operations in the process can also be swapped chronologically. Once the reference number for a multimedia object which is to be played back to the selected call recipient is determined, the multimedia object assigned to this reference number (which, as previously mentioned, is stored in the telecommunication network) is transferred from the telecommunication network to the second telecommunication device of the call recipient within the framework of call signaling and is played back there. In particular in this case a picture of the caller can be displayed on a display device of the second telecommunication device.

This type of process has a number of advantages. On the one hand the caller has control over which multimedia object is played back or displayed to the call recipient. Furthermore only the data link between the telecommunication network and the second telecommunication device is subjected to a load for the data transfer of multimedia content and not the data connection between a first telecommunication device and the telecommunication network. In addition automatic handling is undertaken in the selection of multimedia objects which are sent to a specific call recipient on connection setup. As already mentioned the operations for sending a connection setup request and determining the reference number for a selected call recipient can be executed chronologically in a different sequences.

In accordance with an advantageous embodiment the assignment mapping is present in a first telecommunication device for example in the form of a list or a table, in which case, after the determination of the reference number of a multimedia object for a selected call recipient, the reference number determined is transmitted to the telecommunication network by the first telecommunication device and the network then transmits the multimedia object assigned to the reference number determined to the second telecommunication device. This means that in this case the reference number is determined in the first telecommunication device with the reference number determined then already being transmitted to the telecommunication network.

In accordance with a second advantageous embodiment the assignment mapping, for example in the form of a list or subscriber list, is stored in the telecommunication network so that the determining of a reference number is executed in the telecommunication network. In the latter case the connection between the first telecommunication device and the telecommunication network is also subjected to less of a load and the computing overhead is relocated to the telecommunication network.

In order to take account in this case two of the fact that a connection setup is also to be executed to a call recipient not provided for in the assignment mapping, a specific multimedia object assigned to a subscriber is defined as a so-called standard multimedia object which is also to be used for unknown call recipients. In other words the determining of the object can be arranged so that if a selected call recipient is present for whom no data record is available in the assignment mapping, a reference number of a predetermined multimedia object is output as the reference number determined. This guarantees that each call recipient is sent to a multimedia object assigned to him on connection setup.

In accordance with a further advantageous embodiment a multimedia object with a corresponding reference number of the first telecommunication subscriber is further stored in the second telecommunication device, with in this case a multimedia object only being transmitted to the second telecommunication device from the telecommunication network if the reference number of the multimedia object stored on the second telecommunication device does not correspond to the reference number of the multimedia object to be transmitted. This means that the case can be considered in which a multimedia object of a specific telecommunication subscriber (as caller) has already been transmitted to the second telecommunication device in accordance with a method described above and now this multimedia object, especially picture, is already present on the second telecommunication device. If a new connection setup is now to be executed by the same caller to the second telecommunication device in this case a new transmission of the multimedia object of the caller from the telecommunication network to the second telecommunication device can then be omitted if a multimedia object is already present on the second telecommunication device with the previously determined reference number. In this way the load on the data connection between the telecommunication network and the second telecommunication device can be relieved. A check as to whether the correct multimedia object (with the correct reference number) is present on the second telecommunication device can be made by initially only transmitting the reference number determined of the multimedia object be transmitted before the transmission of a multimedia object to second telecommunication device. After a comparison of the reference number transferred with the reference number stored for the multimedia object in the second telecommunication device, the second telecommunication device can then return a message to the telecommunication network which specifies either that the reference numbers match (so-that no new transmission of the multimedia object to the second telecommunication device is necessary) or that there is no match in the reference numbers so that the telecommunication network is to transfer a multimedia object to the second telecommunication device.

In accordance with a further advantageous embodiment a multimedia object of a telecommunication subscriber, especially the first telecommunication subscriber, in addition to the reference number is also allocated further reference information including a storage authorization specification which specifies whether a multimedia object of the first telecommunication subscriber transferred to the second telecommunication device may be stored there or not. This type or storage authorization specification can be especially useful for the transmission of multimedia objects which feature pictures with company logos with in such a case the local storage on the second telecommunication device having to be forbidden to counteract a misuse of the company logo.

The first and/or the second telecommunication device can for example be embodied as a mobile radio device, a mobile telephone or as a computer with a radio module. In addition it is possible that in the case in which the telecommunication network is embodied as a public fixed telephone network, the first and/or the second telecommunication device is embodied as a corded or cordless telephone. Furthermore it is possible that the telecommunication network is embodied as a public fixed telephone network but also as a mobile network which is specially operates in accordance with the GSM (Global System for Mobile Communication) standard or the UMTS (Universal Mobile Telecommunications system) standard. In the this case, if the telecommunication network is embodied as in mobile radio network, the storage of multimedia objects and the assignment mapping, but also the processing of signals or messages from the telecommunication devices as well as the transmission of signals or messages to the telecommunication devices can be undertaken by what is known as the HLR (Home Location Register). It is also possible that the telecommunication network, features a plurality of subnetworks in which one is embodied as a fixed telephone network and the other as a mobile telephone network.

Furthermore a telecommunication system is created which includes a first and a second telecommunication device as well as a telecommunication network. In this case the first telecommunication device is designed for the setting up a communication link over the telecommunication network, especially a telephone connection to the second telecommunication device in accordance with a method described above.

The hallmark of a method for setting up a communication link from a first telecommunication device over a telecommunication network to a second telecommunication device in accordance with the second aspect of the invention is that at least one multimedia object (with picture, tone information etc) is now stored together with a respective reference number in this second telecommunication device. This means that in what is known as an electronic telephone directory a multimedia object, especially a picture can be provided for one or more telecommunication subscribers. It is also possible for a telecommunication subscriber to be assigned a number of multimedia objects.

In order to guarantee on the caller side in its turn that for a specific call recipient on connection set-up a specific multimedia object desired by the caller is played back an assignment mapping or assignment table with at least one data record is further defined which specifies the assignment between a specific call recipient and a specific reference number of a multimedia object. A desired call recipient is now selected by the caller, in this case by the first telecommunication subscriber assigned to the first telecommunication device. In order to set up a communication link to the recipient and display to him the identity of the caller, for example through a picture, the following operations are to be executed. A connection setup request is sent from the first telecommunication device to the telecommunication network with the connection setup request specifying that a communication link, especially a telephone connection, is to be set up from the first telecommunication device to the second telecommunication device which is assigned to the selected call recipient. Furthermore for the selected call recipient, a reference number of a multi-media object to be transferred to this recipient and to be played back to them is determined on the basis of the assignment mapping. The two operations of sending a connection setup request and the determination of the reference number are to be executed in this case in different chronological order depending on the embodiment, which is explained in greater detail below.

Once a reference number for a multimedia object to be transmitted has been determined, ringing signaling is transferred to the second telecommunication device together with display information. In this case the display information includes the reference number determined or is dependent on this number. In particular it is possible for the reference number to be contained in encoded form in the display information. By using the reference number of a multimedia object now transferred to the second telecommunication device this multimedia object is played back by the second telecommunication device, i.e. a picture of the caller is displayed in particular.

Thus a method with a number of advantages is created in accordance with the second aspect. On the one hand the caller has control over the multimedia object to be played back at the call recipient, furthermore the data transmission overhead from the first telecommunication device to the telecommunication network but also from the telecommunication network to the second telecommunication device is reduced to a minimum since in each case only reference information or a reference number for a picture to be displayed has to be transmitted and not the complete multimedia object.

In accordance with an advantageous embodiment the assignment mapping is provided in the first telecommunication device with in this case, after the determination of the reference number of a multimedia object for the selected call recipient in the first telecommunication device by this (as the first telecommunication device) the reference number determined is transmitted to the telecommunication network which then transmits the corresponding display information for the reference number determined to the second telecommunication device.

In accordance with a further advantageous embodiment the assignment mapping is stored for example in the form of a list or table in the telecommunication network. In this case the determining of a reference number finally occurs in the telecommunication network so that on the one hand the memory requirement and also the computing overhead is reduced in the first telecommunication device.

So that a caller is in a position of being able to provide any given call recipient, even one for whom there is no data record in the assignment mapping, with a specific multimedia object assigned to him, the default multimedia object is defined for such call recipients for whom there is no provision in the assignment mapping. This can for example be implemented such that the determining makes provision that if a selected call recipient is present for whom no data record is present in the assignment mapping, a reference number of a predetermined multimedia object is output as standard reference number.

In accordance with an advantageous embodiment a plurality of multimedia objects of telecommunication subscribers together with a respective reference number are further stored in the telecommunication network. In particular in this case multimedia objects which are assigned to the first telecommunication subscriber are stored in the telecommunication network. The provision of multimedia objects, especially pictures of telecommunication subscribers in the telecommunication network can in this case be especially advantageous if there is to be a guarantee of the current multimedia objects (of the first telecommunication subscriber) always being played back in the second telecommunication device. For this purpose after transmission of the display information to the second telecommunication device, the comparing of the transmitted display information with a reference number of a multimedia object assigned to the first telecommunication subscriber and stored in the second telecommunication device can be executed, in which case, if the result of the comparison between the display information and the reference number is negative, i.e. if there is no match, an updating request message is returned to the telecommunication network which specifies that the telecommunication network is to transmit a multimedia object corresponding to the display information to the second telecommunication device. Subsequently the telecommunication network can then in response to the updating request message, transfer a multimedia object corresponding to the display information to the second telecommunication device.

In accordance with a further advantageous embodiment a multimedia object of a telecommunication subscriber which is stored in the network, in addition to the reference number, also features further reference information including a storage authorization specification which specifies whether a multimedia object of a telecommunication subscriber (especially of the first telecommunication subscriber) transmitted to the second telecommunication device, may be stored there or not. This type of storage authorization specification can be sensible to counteract undesired processing of the multimedia object. Especially with the transmission of a company logo within a multimedia object a misuse of the logo can be prevented in this way.

In accordance with an advantageous embodiment the first and/or the second telecommunication device can be embodied as a mobile radio device, a mobile telephone, a computer with radio module or as a landline telephone. In the addition the telecommunication network can be embodied as a public switched telephone network or as a mobile radio network, which operates in particular in accordance with the GSM or the UMTS standard. In this case, if the telecommunication network is embodied as a mobile radio network the storage of assignment mapping or multimedia objects, but also the processing of signals or messages from the telecommunication devices as well as the transmission of signals or messages to the telecommunication devices can be undertaken by what is known as the HLR (Home Location Register).

Furthermore a telecommunication system is created which includes a first and a second telecommunication device and also a telecommunication network. The first telecommunication device is designed in this case to set up a communication link via the telecommunication network to the second telecommunication device in accordance with a method according to the second aspect of the invention.

Starting from the case in which a telephone connection is to be established from the first telecommunication device to the second telecommunication device and in which multimedia objects of telecommunication subscribers are stored in the second telecommunication device, a connection setup request can be sent within the framework of determining a directory number. To put it more precisely, so that the caller (first telecommunication subscriber) at a call recipient (second telecommunication subscriber) on connection setup can achieve the playback of a specific multimedia object or the display of a specific picture, the directory number of the caller is transmitted with a specific control code (for the multimedia object to be played back) from the first telecommunication device to the telecommunication network which then receives the received control code and further processes it. In this case the processing is typically undertaken on the basis of the assignment mapping, with the directory number to be transferred to the second telecommunication device of the caller being appended to a further control code or a display of the playback information for controlling the multimedia object to be played back at the second telecommunication device. If the second telecommunication device is able to detect the display information or playback information and evaluate it, the multimedia object desired by the caller can then be played back. If however the second telecommunication device is not able to interpret the directory number expanded by the display information the transferred directory number along with the (non-interpretable) control code is displayed for example on a display of the second telecommunication device. The important aspect of this type of signaling lies in the encoding of the connection setup request or call signalling through backwards-compatible control codes in the directory number transfer and in the functionality of the (receiving) second telecommunication device to accordingly select and output the entries stored in this second telecommunication device for the directory number transferred for multimedia objects.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a functional block diagram indicating an option for assigning pictures to a telecommunication subscriber;

FIG. 2 is a block diagram of three typical multimedia objects which are assigned to a (first) telecommunication subscriber and can be stored either in a telecommunication network or in a (second) telecommunication device FIG. 3 is a table for an assignment mapping or a list for a telecommunication subscriber in which specific further telecommunication subscribers entered as call recipients are assigned specific reference numbers which refer to multimedia objects such as pictures which the call recipient has to play back or display on connection setup;

FIG. 4 is a block diagram of a telecommunication system for explaining the setup of a telecommunication link, especially telephone connection from a first telecommunication device to a second telecommunication device in accordance with a first embodiment;

FIG. 5 is a block diagram of a telecommunication system for explaining the setup of a telecommunication link, especially telephone connection from a first telecommunication device to a second telecommunication device in accordance with a second embodiment;

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Reference is now made to FIG. 1, which shows two different options for assigning a multimedia object, such as a picture, to a user. Thus it is possible for example (as shown on the left hand side) for a telecommunication subscriber as the caller to be assigned a specific multimedia object, which is played back at a call recipient on setup of a telecommunication link (especially before the setup of a voice connection in telephony) and in the case of a picture is to be displayed.

It is however also possible for the playback or display of a multimedia object at a call recipient to also be handled in different ways during the connection setup signaling. Thus it is possible (as shown on the right hand side of the diagram) for a different multimedia object to be played back or displayed for a telecommunication subscriber, depending on the telephone number from which the telecommunication subscriber or the caller is calling. On the other hand it is also conceivable for a call recipient to have different telephone numbers, with each telephone number being assigned a specific multimedia object of the caller, to be played back or displayed on a connection setup.

For the sake of simplicity the following explanation in accordance with FIGS. 2 to 5 uses as its starting point the fact that a specific call recipient is to be assigned a specific multimedia object. Naturally, as already mentioned, a (different) multimedia object can be assigned to each telephone number of the call recipient, the object then being played back to the call recipient during connection setup.

It should further be made clear that to simplify the presentation below, instead of a multimedia object assigned to a caller, reference is made merely to a picture assigned to the caller or telecommunication subscriber which is to be displayed to the call recipient on connection setup. Obviously not just a picture but also sound information such as ring tones or other multimedia information can be provided in a multimedia object.

Examples of multimedia objects of telecommunication subscribers (abbreviated to subscribers below), which are stored in a telecommunication network, can be seen in FIG. 2. In this case three multimedia objects MO1, MO2 and MO3 can be stored for a subscriber A in the network. The first multimedia object MO1 includes a picture B1, the second multimedia object MO2 includes a picture B2 and the third multimedia object MO3 includes the picture B3. Furthermore the three multimedia objects are also assigned reference information RI. The reference information in this case includes the subscriber TN to whom the multimedia objects are assigned, a reference number RO, a storage authorization specification BR which specifies whether a multimedia object transmitted to a call recipient can be stored on the telecommunication device of the call recipient or not, and an assignment specification ZO which specifies the groups or selected groups of call recipients for which the relevant object or picture is to be used for display. To put it more precisely the first multimedia object MO1 is assigned the reference information RI1 here which specifies that the multimedia object MO1 is allocated to the subscriber A, that it has the reference number 1, that (as regards storage authorization) the multimedia object MO1 or the picture B1 may not be stored locally on a telecommunication device of a call recipient, and that the multimedia object MO1 or the picture B1 are to be used as the defaults for call recipients not specified on a particular list of the subscriber A (cf. FIG. 3). The second multimedia object MO2 is assigned reference information R12 which specifies that the multi-media object MO2 is assigned to subscriber A, that the multimedia object MO2 has the reference number 2, that the multimedia object is allowed to be stored on a telecommunication device of a call recipient and that the picture is assigned to a specific list of call recipients of subscriber A (cf. again FIG. 3). Finally the third multimedia object MO3 is assigned reference information RI3 which specifies that the multimedia object MO3 is allocated to subscriber A, that the multimedia object MO3 is given the reference number 3, that a local storage on a telecommunication device of the call recipient is allowed and that the multimedia object MO3 belongs to an assignment list of subscriber A (cf. again FIG. 3).

Reference is now made to FIG. 3 which shows an assignment mapping or list which is assigned to a subscriber A. Such a list can for example, as will also explained with reference to FIGS. 4 and 5, be stored in a telecommunication network. In this list the left hand column with the heading RE gives a list of subscribers as call recipients who are assigned in column RO specific reference numbers for multimedia objects or pictures which are to be played back or displayed to a corresponding call recipient on connection setup.

Reference is now made to FIG. 4, which shows a first embodiment of a telecommunication system to execute a method for setting up a communication connection or telephone connection. The telecommunication system in this case includes a first telecommunication device TA, a second telecommunication device B as well as a telecommunication network NW which is designed for the switching of data or information or messages between the telecommunication devices TA and TB In this case the telecommunication network NW is a mobile radio network which is connected via an air interface to telecommunication devices TA and TB designed as mobile telephones. Both the mobile telephones TA and TB and also the mobile communication network MW can in this case operate in accordance with the GSM (Global System for Mobile Communication) standard, the UMTS (Universal Mobile Telecommunications System) standard or another mobile radio standard.

In the telecommunication network NW is a storage area SP (for example in the HLR of the network), in which multimedia objects of telecommunication subscribers are stored, with, as already mentioned, for the sake of simplicity, the pictures B1, B2 and B3 contained in this multimedia object being shown in the diagram to represent the objects themselves. Furthermore a list LA is stored in the network as assignment mapping, which specifies which picture with a specific reference number is to be displayed for a specific call recipient on connection setup. A control device ST is used for management of the storage SP and of the LA, as well as for processing of messages from the mobile telephones TA and TB and for transmission of signals or messages to these telephones.

It is now assumed that in a first case the subscriber A assigned to the first mobile telephone TA would like to call a subscriber B over the telecommunication network NW. To do this, subscriber A or mobile telephone TA sends a connection setup request or an outgoing call message OC to the telecommunication network NW. A check is then made as to whether an assignment mapping or list LA is available for subscriber A, and if it is, whether the call recipient contained in the connection setup request (in the present case) B, is contained in the list LA2 (cf. FIG. 3). The telecommunication network now detects for subscriber B that they are not contained in the list LA and then attempts to determine a default picture to be transmitted to subscribers or call recipients who are not contained in the list LA. As already mentioned in FIG. 2, the multimedia object MO1 or the picture B1 is defined as a default and is to be used for any call recipients who are not contained in the list LA. Since the picture B1 has a business connection to subscriber A, with the company logo (here the "@" symbol) being included, the call recipient, namely the subscriber B, to avoid the misuse of the company logo, should not be allowed to store the picture B1 on his mobile telephone TB. In this context it has already been mentioned with regard to FIG. 2 that the storage authorizations specification is listed accordingly in the reference information RI1 for the picture B. If the telecommunication network NW has now determined the picture B1 as the default picture, this picture is transferred within the context of a ringing signaling or an incoming call message IC to the mobile telephone TB. This picture B1 is then shown on a display DSP. Conventionally this type of ringing signaling (at a point in time at which the actual connection or voice connection has not yet been established) is accompanied at the second mobile telephone TB by the output of sound or tone information, known as a ring tone, so that the subscriber B is informed about the call request by subscriber A. In this case either a tone sequence already stored in mobile telephone TB can be played back or corresponding tone information or a ring tone information can be sent with the picture B1 to the mobile telephone TB. The advantage of transmitting ring tones at the same time is the request for connection set up on the part of subscriber A can already be perceived as an individual request audibly by subscriber B. Whereas subscriber B is now a informed about the request for connection setup on the part of subscriber A, he can look at the picture of subscriber A and consider whether he wishes to set up a (bidirectional) voice connection to subscriber A, by for example pressing a corresponding key to accept the call.

The present method for setting up a call or a communication link thus has the advantage that the subscriber A as the caller can determine which picture of him is to be displayed to subscriber B. Furthermore it is advantageous for the subscriber A, by defining an assignment mapping LA once, even on repeated calling of subscriber B or of other call recipients no longer needs to be concerned about picture selection since the assignment information of the picture to be displayed and the call recipient is stored as assignment mapping or as list LA in the network.

Reference is now made to FIG. 5 which shows a telecommunication system in accordance with a further embodiment of the invention. This telecommunication system essentially corresponds to the telecommunication system shown in FIG. 4, with the hallmark now being that pictures B3 and B5 of subscribers are stored in the second mobile telephone TB, with these pictures again being allocated a particular reference number.

A communication connection or telephone connection is now to be set up from subscriber A to a subscriber D over the telecommunication network NW. To this end the mobile telephone TA assigned to the subscriber A sends a connection setup request or an outgoing call message OC to the telecommunication network NW which specifies that a connection is to be established to subscriber D. The control device ST now processes the connection setup request OC and checks whether the subscriber D is contained in the list LA (cf. FIG. 3) of selected call recipients of subscriber A. With regard to subscriber D the control device ST establishes that the subscriber D is contained in the list LA and that a picture with the reference number 3 is to be displayed to this subscriber. To reduce the data transmitted over an air interface from the telecommunication network to the second mobile telephone TB, since in this embodiment of the invention pictures of subscribers are stored in mobile telephone TB, the picture itself is not transferred from the telecommunication network to the mobile telephone TB but merely a reference to picture. A reference can in this case feature both the information about the calling subscriber (subscriber A) as well as the number of the picture assigned to this subscriber (in this case the number 2). If the management of pictures is only undertaken via the telecommunication network NW, it is possible that this network assigns each picture which is included in the ringing signal in accordance with the invention a unique, possibly encoded, reference number. In this case the subscriber and a reference number assigned to him does not have to be specified explicitly. A unique reference number is sufficient.

The reference number, in a form as already explained is then transferred as display information AI via ringing signalling or an incoming call message from a telecommunication network NW to the mobile telephone TB. The mobile telephone TB then checks whether a picture corresponding to the display information AI is stored in the internal memory SI of the mobile telephone. In the first case it is now assumed that the picture is stored for display information AI, with the picture then being shown on the display DSP of the mobile telephone. During the signaling that subscriber A would like to set up a connection to subscriber D, audible information, especially a ring tone or ring tones, can also be output at mobile telephone TB. As well as the audible signal a mechanical signal, for example in the form of vibration of the mobile telephone TB, can also be emitted to signal to the subscriber D that the subscriber A would like to set up a call to him. Subscriber D now sees the picture of subscriber A on his display and can decide whether he would like to accept the call from subscriber A and establish a (bidirectional) voice connection to subscriber A. If he wishes to do so he will for example press a corresponding call acceptance key (not shown) on the mobile telephone TB and thereby accept the call.

A second case will now be considered in which the picture corresponding to the display information AI is not stored in a mobile telephone TB. Unlike in a first case in which the display information AI has specified a reference to the picture B3 stored in the mobile telephone TB, it is now assumed that caller A would like a picture with the reference number 2 to be displayed to subscriber D. Accordingly, in this case 2 the list LA shown in FIG. 3 will be altered so that the reference number 2 is assigned to the call recipient D. Let the picture with the reference 2 be stored in the telecommunication network NW in this case (see also FIG. 2 in this context). If subscriber A now sends an outgoing call message OC with the specification that the subscriber D is to be called to the telecommunication network NW, the control device ST determines with reference to the list LA that the call recipient D is now to be sent a picture with a reference number 2, and subsequently generates display information AI, which points to the picture with the reference number 2. The display information is sent as in case 1 via an incoming call message IC to the mobile telephone TB, which then checks whether a picture with the reference number 2 is present. In the present case however no picture is stored on the mobile telephone TB with the reference number 2, so that the mobile telephone TB (shown by a dashed arrow) returns an update request message AA to the telecommunication network NW in order to indicate that no picture with the reference number 2 is present and that the telecommunication network NW is to transfer a corresponding picture (B2, again cf. FIG. 2) to the mobile telephone TB. In an updating message AN the telecommunication network finally transmits the picture B2 to the mobile telephone TB in response to the message AAN (again shown by a dashed arrow). This picture can then be shown on the display DSP as a picture for signaling a connection setup (not shown in the Figure). The subscriber D can now decide whether he wishes to except the call from subscriber A and would like to set up a connection to the latter. This would now be done as follows. If the connection to subscriber A is ended it is possible for the mobile telephone TB to ask the subscriber D whether the picture B2 transmitted during the updating process is now to be stored locally or whether it is to be discarded. Subscriber D can now confirmed the local storage of the picture, at which point the picture B2 including its reference information, such as "subscriber A,2" for example, will be stored. The means that the picture B2 can also be retrieved without an existing connection to the telecommunication network or to the first mobile telephone TA and can for example be used within the framework of an electronic scheduler or telephone directory on the mobile telephone TB. If subscriber A again attempts to establish a connection to subscriber D, the same procedural sequence occurs again in accordance with one of the two cases just presented. If the appropriate picture for the display information AI is present during ringing signaling in mobile telephone TB, the sequence in accordance with the case 1 is processed, whereas in the case in which the picture referenced in the display information AI is not present in mobile telephone TB, the sequence in accordance with case 2 is executed.

If subscriber A wishes a further picture (in addition to the pictures shown in FIG. 2) of himself to be shown to his friends or acquaintances while a connection is being set up he must first have the desired picture generated or provided. Furthermore, as shown in FIG. 2 he must provide reference information for the new picture and finally send this picture along with the reference information to the telecommunication network (for example by an e-mail to the network operator). The new picture can then be stored as a picture with a new separate reference number in the network, but it can also be stored under an existing reference number in the telecommunication network, in which case it then replaces an old existing picture.

A possible ringing signaling within the context of telephone number identification will now be presented below. In this case the description again departs from that described in FIG. 5 in that multimedia objects such as pictures or ring tone data are for example stored in a type of telephone directory in the mobile telephone of the call recipient. The signalling from a calling mobile telephone to the telecommunication network (in accordance with the connection setup request OC) is for example undertaken using SS codes before the called MSISDN or "Mobile Subscriber ISDN" (for example:

*XX#04912345678). The signalling from the telecommunication network to a mobile telephone of the core recipient is undertaken (within the context of call signalling IC) accordingly in the transferred telephone number (for example: +49 987654321*3#4) for the MSISDN of the calling subscriber, with in addition the reference for a ring tone file 3 and a picture 4 being appended. If for example the mobile telephone of the call recipient has now stored in a telephone directory (for example in the form of a table) its specific pictures and ring tone files for a telephone number, the mobile telephone can then, on connection setup or on ringing signaling, determine from a caller on the basis of the telephone directory the corresponding ring tone file and the picture and have these played back or displayed. A mobile telephone (on the call recipient side) which does not support the signaling in the telephone number transfer then merely displays on connection setup the control codes at the end of the caller telephone number transferred. Since the sequence is unaffected by this, this form of signaling is backwards compatible with the original call number transfer.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for setting up a communication link from a first telecommunication device over a telecommunication network to a second telecommunication device, comprising:

storing in the telecommunication network multimedia objects assigned to a first telecommunication subscriber, each multimedia object having a corresponding reference number;

defining an assignment mapping using at least one data set which specifies assignment of a specific call recipient to a specific reference number of a specific multimedia object;

sending a connection setup request from the telecommunication device assigned to the first telecommunication subscriber to the telecommunication network which specifies that a communication link from the first telecommunication device to a second telecommunication device assigned to a second telecommunication subscriber is to be set up;

determining the corresponding reference number specified for the second telecommunication subscriber based on the assignment mapping;

transmitting, from the telecommunication network to the second telecommunication device, an identified multimedia object assigned to the corresponding reference number;

playing back the identified multimedia object on the second telecommunication device, and wherein said determining of the corresponding reference number for the second telecommunication subscriber is performed by the first telecommunication device, and wherein said method further comprises:

storing the assignment mapping in the first telecommunication device, and after said determining of the corresponding reference number for the second telecommunication subscriber, transmitting the corresponding reference number from the first telecommunication device to the telecommunication network prior to said transmitting of the identified multimedia object to the second telecommunication device, wherein said determining of the corresponding reference number is performed by the telecommunication network, wherein said determining indicates a predetermined reference number of a predetermined multimedia object if no data record is present in the assignment mapping for the second telecommunication subscriber.

2. A method according to claim 1, further comprising storing in the second telecommunication device a first subscriber multimedia object related to the first telecommunication subscriber, and wherein said transmitting of the identified multimedia object from the telecommunication network to the second telecommunication device only if the corresponding reference number of the first subscriber multimedia object stored on the second telecommunication device does not match the corresponding reference number of the identified multimedia object.

3. A method according to claim 2, further comprising prior to said transmitting of the identified multimedia object:

transmitting from the telecommunication network to the second telecommunication device the corresponding reference number of the identified multimedia object; and comparing the corresponding reference number of the identified multimedia object with the corresponding reference number of the first subscriber multimedia object stored on the second telecommunication device to determine whether the identified multimedia object is present on the second telecommunication device; and after said comparing, returning a message from the second telecommunication device to the telecommunication network indicating whether the corresponding reference number of the first subscriber multimedia object matches the corresponding reference number of the identified multimedia object.

4. A method according to claim 1, wherein the multimedia objects assigned to the first telecommunication subscriber have associated therewith a storage authorization specification indicating whether the multimedia objects assigned to the first telecommunication subscriber may be stored on the second telecommunication device after said transmitting thereof.

5. A method according to claim 1, wherein the multimedia objects include at least one of a picture and tone information.

6. A method according to claim 1, wherein at least one of the first and second telecommunication devices is one of a mobile radio device, a mobile telephone, a computer with radio module and a landline telephone.

7. A method according to claim 1, wherein the telecommunication network is at least one of a public fixed line telephone network and a mobile radio network which operating according to at least one of the Global System for Mobile communication and Universal Mobile Telecommunications System standard.

8. A telecommunication system, comprising: first and second telecommunication devices connected via a telecommunication network, the first telecommunication device setting up a communication link to the second telecommunication device via the telecommunication network using a method in accordance with claim 1.

* * * * *